United States Patent
Shin

(10) Patent No.: US 9,012,532 B2
(45) Date of Patent: Apr. 21, 2015

(54) ACRYLIC ARTIFICIAL MARBLE HAVING GRANITE PATTERN AND METHOD OF MANUFACTURING THE SAME

(75) Inventor: Sang Ho Shin, Chungcheongbuk-do (KR)

(73) Assignee: LG Hausys, Ltd., Seoul (KR)

( * ) Notice: Subject to any disclaimer, the term of this patent is extended or adjusted under 35 U.S.C. 154(b) by 0 days.

(21) Appl. No.: 13/816,139

(22) PCT Filed: Aug. 24, 2011

(86) PCT No.: PCT/KR2011/006249
§ 371 (c)(1),
(2), (4) Date: Feb. 8, 2013

(87) PCT Pub. No.: WO2012/026754
PCT Pub. Date: Mar. 1, 2012

(65) Prior Publication Data
US 2013/0137810 A1      May 30, 2013

(30) Foreign Application Priority Data
Aug. 27, 2010   (KR) .................. 10-2010-0083319

(51) Int. Cl.
*C09D 5/29*     (2006.01)
*B44F 9/04*     (2006.01)
*C04B 26/06*    (2006.01)
*B28D 1/00*     (2006.01)
*C04B 111/54*   (2006.01)

(52) U.S. Cl.
CPC . *B44F 9/04* (2013.01); *C04B 26/06* (2013.01); *C04B 2111/545* (2013.01); *B28D 1/00* (2013.01)

(58) Field of Classification Search
USPC ............... 523/171; 264/173.16, 173.18, 175, 264/176.1, 299
See application file for complete search history.

(56) References Cited

U.S. PATENT DOCUMENTS

2007/0004824 A1* 1/2007 Kim et al. .................... 523/171
2009/0045540 A1* 2/2009 Sung et al. .................... 264/73

FOREIGN PATENT DOCUMENTS

| CN | 1302281 A | 7/2001 |
|---|---|---|
| CN | 1921991 A | 2/2007 |
| JP | 2007-528337 A | 10/2007 |
| KR | 10-2004-0059913 | 7/2004 |
| KR | 10-0555441 | 2/2006 |
| KR | 10-2006-0083516 | 7/2006 |
| KR | 10-2006-0114497 | 11/2006 |
| KR | 10-0751576 | 8/2007 |
| WO | 2006101296 A1 | 9/2006 |

* cited by examiner

*Primary Examiner* — Nicole M Buie-Hatcher
*Assistant Examiner* — Chelsea M Lowe
(74) *Attorney, Agent, or Firm* — McKenna Long & Aldridge, LLP

(57) ABSTRACT

The present invention relates to an acrylic artificial marble having a granite pattern and a method of manufacturing the same, which can provide a natural marble effect by mixing and molding two or more compounds having different colors and thus can obtain a granite pattern in which patterns of the two or more compounds are smoothly mixed, and which can obtain a desired pattern remarkably similar to a pattern of natural stone by using a multicolor chip sheet.

10 Claims, 3 Drawing Sheets

ACRYLIC ARTIFICIAL MARBLE HAVING GRANITE PATTERN AND METHOD OF MANUFACTURING THE SAME

This application is a National Stage Entry of International Application No. PCT/KR2011/006249 14, filed Aug. 24, 2011, and claims the benefit of Korean Application No. 10-2010-0083319, filed on Aug. 27, 2010, which are hereby incorporated by reference in its entirety for all purposes as if fully set forth herein.

TECHNICAL FIELD

The present invention relates to an acrylic artificial marble and a method of manufacturing the same, and more particularly, to an acrylic artificial marble having a granite pattern and a method of manufacturing the same, which can provide a natural marble effect by mixing and molding two or more compounds having different colors and thus can obtain a granite pattern in which patterns of the two or more compounds are smoothly mixed, and which can obtain a desired pattern remarkably similar to a pattern of natural stone by using a multicolor chip sheet.

BACKGROUND ART

Generally, because artificial marble formed of an acrylic resin has many advantages such as beautiful appearance, excellent workability, light and excellent strength, it is widely used as a material for counter table and various interior materials. However, there is a technical limitation to provide various patterns using the combination of single-colored chips, compared to natural stone or granite.

In manufacturing the acrylic artificial marble, an inorganic filler such as aluminium hydroxide, calcium carbonate and silica, an initiator such as pigment and hardener, and an additive such as releasing agent and dispersing agent are mixed in syrup mixed with polymethyl methacrylate and a monomer such as methyl methacrylate, and then the mixture is molded and cured in a casting mold.

Herein, a raw material such as pigments and chips is used as a means for indicating a color and a shape. A main component of the chip is the same as the artificial marble. The raw material is prepared by the same process as a manufacturing process of the artificial marble after adding a single color pigment and then ground so as to have various colors and particle sizes.

In the prior art, when manufacturing the artificial marble using the chip, multiple single colored chips of which each has a different color are prepared and then added into the base raw material so as to form a natural granite pattern. However, since the pattern and appearance of the artificial marble manufactured with the single colored chips are monotonous and artificial, there is also a technical limitation to realistically reproduce the natural pattern and color.

DISCLOSURE OF INVENTION

Technical Problem

An object of the present invention is to provide acrylic artificial marble which can improve the monotonous and artificial feelings of the artificial marble manufactured with the single colored chips, and also can overcome the limitation in providing various colors and patterns using the single colored chip and thus can obtain the granite effect in which patterns of two or more compounds are smoothly appeared and mixed, thereby providing desired patterns remarkably similar to patterns of natural stone and various granite patterns.

Another object of the present invention is to provide a method of manufacturing the artificial marble having granite patterns.

Solution to Problem

To achieve the object of the present invention, the present invention provides an acrylic artificial marble, wherein a natural granite pattern is smoothly formed using two or more compounds.

Further, the present invention provides a method of manufacturing acrylic artificial marble, including (a) kneading a liquid raw material for artificial marble; (b) forming two or more kinds of sheets by putting the kneaded liquid raw material, the inorganic filler and the chip into a kneader; (c) putting two or more kinds of sheets into a separate kneader and mixing them; (d) forming a sheet having a marble pattern using a mixed material; (e) chipping a formed marble sheet; and (f) pouring and molding a prepared sheet of artificial marble compound in a mold and then separating, cooling and polishing a molded product.

Advantageous Effects of Invention

As shown in FIGS. 1 and 2 of the present invention, it is possible to provide a natural marble effect by mixing and molding two or more compounds having different colors and thus to obtain a granite pattern in which patterns of the two or more compounds are smoothly mixed, and also it is possible to obtain a desired pattern remarkably similar to a pattern of natural stone by using a multicolor chip sheet.

In order to provide further various granite patterns, the artificial marble is manufactured by using a sheet of granite tone prepared by adding various sheets.

BRIEF DESCRIPTION OF DRAWINGS

The above and other objects, features and advantages of the present invention will become apparent from the following description of preferred embodiments given in conjunction with the accompany drawings, in which.

BEST MODE FOR CARRYING OUT THE INVENTION

Hereinafter, the embodiments of the present invention will be described in detail.

The present invention provides acrylic artificial marble having a granite pattern manufactured by using two or more compounds which contain a liquid raw material containing 50~700 parts by weight of an inorganic filler, 0.2~5 parts by weight of a crosslinking agent and 0.2~3 parts by weight of a crosslinking accelerator with respect to 100 parts by weight of acrylic resin syrup; an inorganic filler; and a chip.

Preferably, particles forming the granite pattern have a particle size of 5~50 pi.

Further, the present invention provides a method of manufacturing the acrylic artificial marble including (a) kneading the liquid raw material for artificial marble; (b) forming two or more kinds of sheets by putting the kneaded liquid raw material, the inorganic filler and the chip into a kneader; (c) putting two or more kinds of sheets into a separate kneader and mixing them; (d) forming a sheet having a marble pattern using a mixed material; (e) chipping the formed marble sheet; and (f) pouring and molding a prepared sheet of artificial marble compound in a mold and then separating, cooling and polishing a molded product.

Further, after the step (e), the sheet having the marble pattern may be formed by nondirectional-spreading and pressing the chip chipped into a size of 10~40 pi, and the prepared sheet of artificial marble compound is poured and molded in the mold and separated from the mold, and then the molded product is cooled and polished, thereby manufacturing the acrylic artificial marble.

Figure 1:
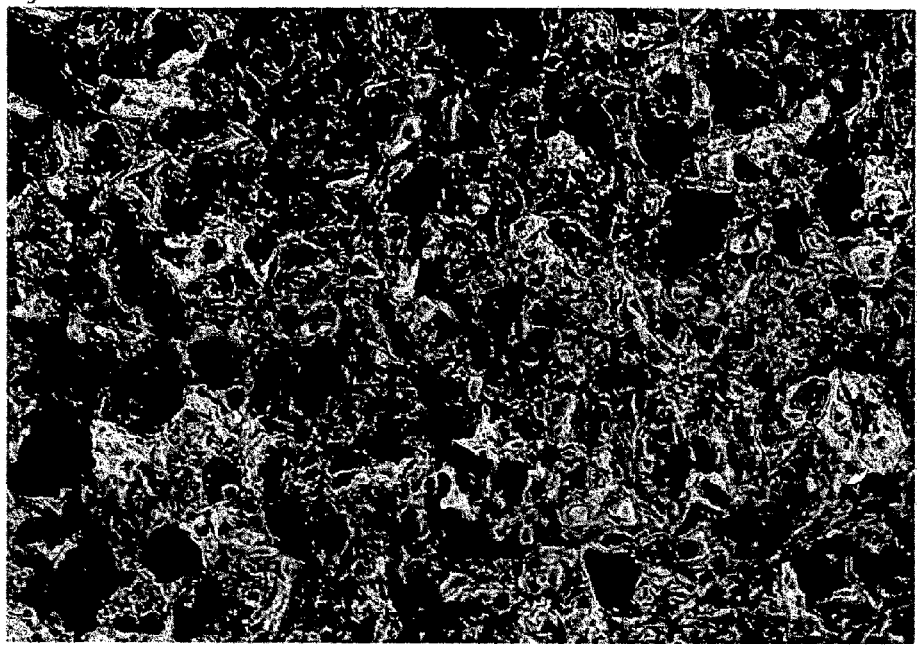
FIG. 1 is a view showing an artificial marble panel of granite tone according to an embodiment of the present invention.
Figure 2:
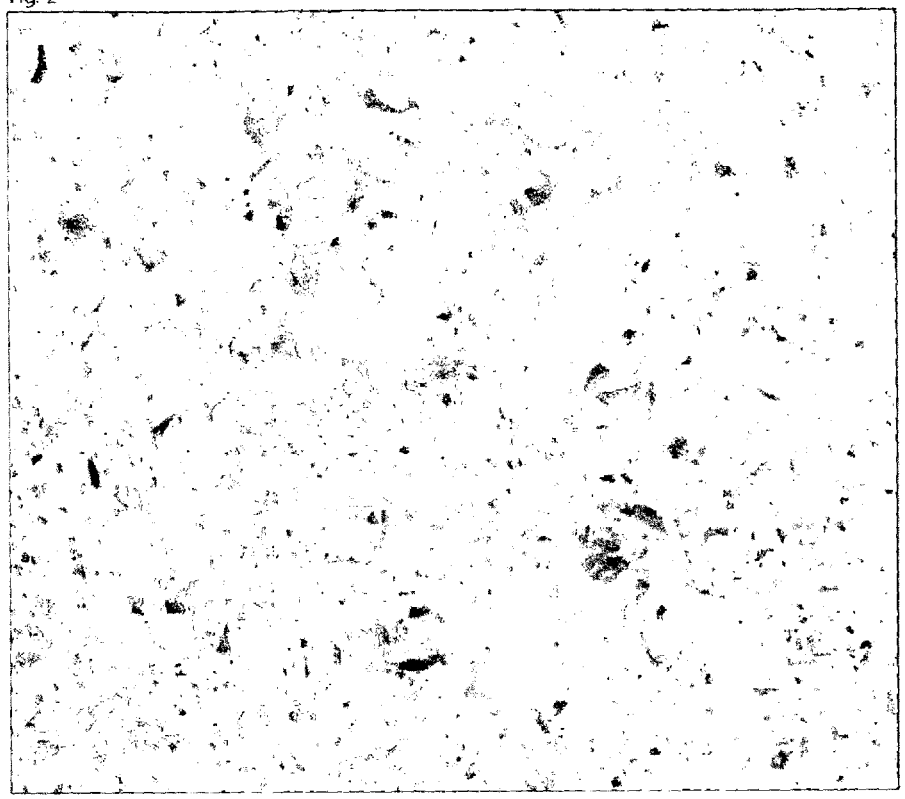
FIG. 2 is a view showing an artificial marble panel of granite tone according to another embodiment of the present invention.
Figure 3:
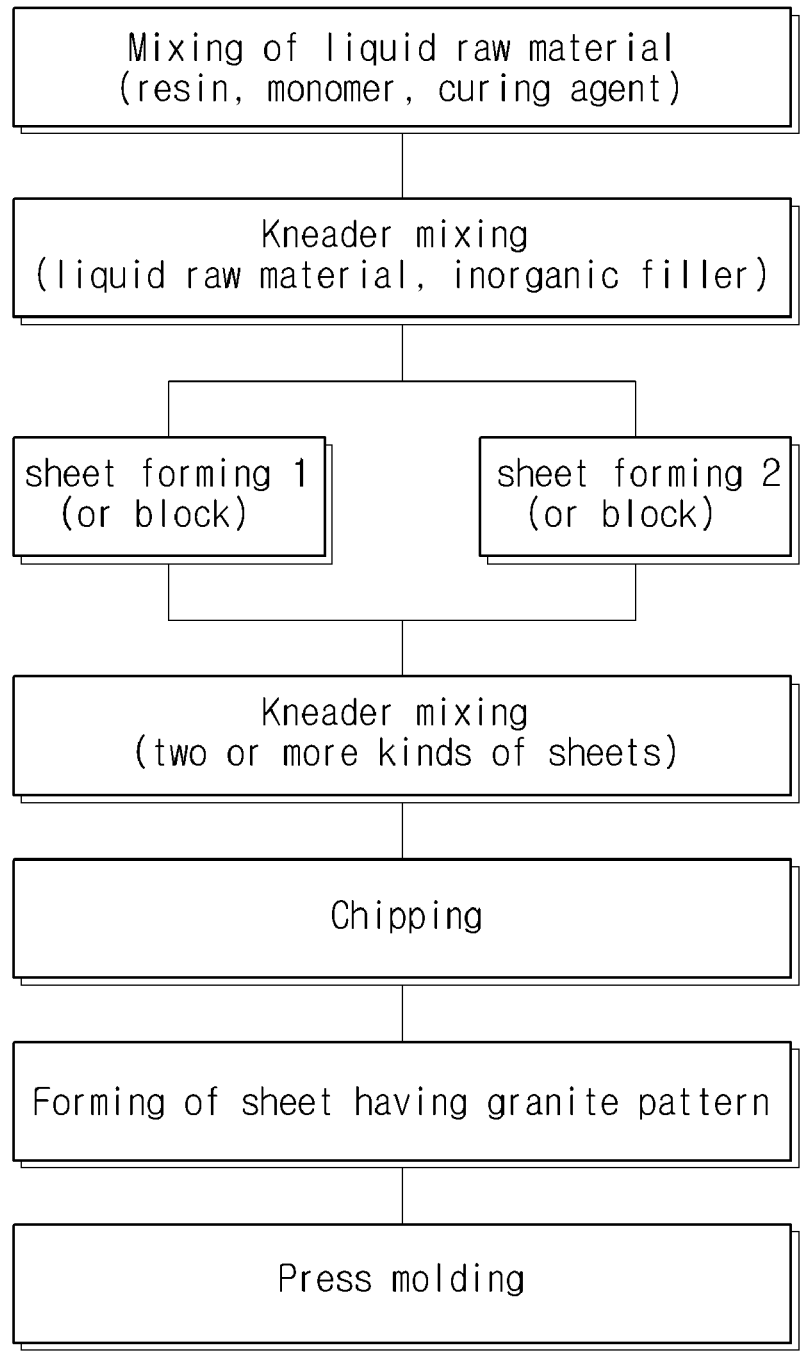
FIG. 3 is a flow chart showing a method of manufacturing acrylic artificial marble according to the present invention.

The method of manufacturing the acrylic artificial marble is shown in FIG. 3.

In the step (a) of kneading the liquid raw material, the reason of kneading the liquid raw material is caused by that the raw material is prepared to have a high viscosity in order to embody an optimal pattern upon the press forming. And in the step (b), the reason of forming the sheet is to allow the sheet to be charged in the mold, thereby facilitating the molding process.

The liquid raw material for artificial marble in the step (a) contains 50~700 parts by weight of inorganic filler, 0.2~5 parts by weight of crosslinking agent and 0.2~3 parts by weight of crosslinking accelerator with respect to 100 parts by weight of acrylic resin syrup which contains 10~50% by weight of acrylic resin and 50~90% by weight of an acrylic monomer.

Preferably, the viscosity of the liquid raw material for artificial marble in the step (a) is 5,000~100,000 Ps.

If the viscosity is less than 5,000 Ps, it is difficult to form the natural pattern due to excessive mixing, and if the viscosity is more than 100,000 Ps, the formed pattern is unnatural, because the liquid raw material is not mixed well.

200~500 parts by weight of the inorganic filler and 0-300 parts by weight, preferably 50~200 parts by weight of the chip are used with respect to 100 parts by weight of the liquid raw material in the step (b).

It is preferable that a polymerizable monomer of the acrylic resin syrup is an acrylic monomer. More detailed, the acrylic resin syrup is one methacrylate monomer or a mixture of two or more selected from methyl methacrylate, ethyl methacrylate, butyl methacrylate, 2-ethylhexyl methacrylate, benzyl methacrylate and glycidyl methacrylate, or may be a mixture of the methacrylate monomer and a partially polymerized polymer. The methyl methacrylate is the most preferable among them. It is preferable that the content of polymer in the syrup is 10~50% by weight.

The inorganic filler may be one or a mixture of two or more selected from inorganic powders typically used in the art, such as aluminium hydroxide, magnesium hydroxide, calcium aluminate, calcium carbonate, silica powder and alumina. Preferably, a particle size of the inorganic filler is 3~200 μm and the inorganic filler is surface-treated with a silane coupling agent, a titanate coupling agent or stearic acid in order to improve dispersibility with a resin and a mechanical strength of a product and also to prevent precipitation thereof. Preferably, the content of the inorganic filler is 200~500 parts by weight with respect to 100 parts by weight of the resin syrup.

If the content is less than 200 parts by weight, it is difficult to form the natural pattern due to a low viscosity and thus excessive mixing, and if the content is more than 500 parts by weight, the formed pattern is unnatural, because the inorganic filler is not mixed well.

The crosslinking agent used in the present invention is one or a mixture of two or more selected from multifunctional acrylic monomers, which have a copolymerizable double bond in molecules so as to be cross-linked with the acrylic resin syrup, such as ethylene glycol dimethacrylate, diethylene glycol dimethacrylate, triethylene glycol dimethacrylate, tetraethylene glycol dimethacrylate, trimethylolpropane trimethacrylate, 1,6-hexane diol dimethacrylate, polybutylene glycol dimethacrylate and neopentyl glycol dimethacrylate. The ethylene glycol dimethacrylate is the most preferable among them.

If the crosslinking agent is not used or an excessively small amount of the crosslinking agent is used, an uneven surface of the artificial marble may be generated and bubbles are generated at upper and lower portions of the artificial marble. Thus, binding force among atoms is lowered, and heat resistance and heat discoloration resistance are deteriorated. If an excessively large amount of the crosslinking agent is used, phase separation of the chips occurs, and thus many problems are generated at the marble pattern. Preferably, the content of the crosslinking agent is 0.2~5 parts by weight with respect to 100 parts by weight of the resin syrup.

The crosslinking accelerator used in the present invention is one or a mixture of two or more selected from organic peroxides such as benzoyl peroxide, diacyl peroxide like dicumyl peroxide, butylhydro peroxide, hydro peroxide like cumylhydro peroxide, t-butyl peroxy maleic acid, t-butylhydro peroxide, t-butyl hydroperoxy butylate, acetyl peroxide, lauroyl peroxide, azobisisobutyronitrile, azobisisodimethylvaleronitrile, t-butyl peroxy neodecanoate and t-amyl peroxy-2-ethylhexanoate. Further, the resin syrup may be polymerized and cured at the room temperature using a mixture of peroxide of amine and sulfuric acid or a mixture of peroxide and cobalt compound. Preferably, the content of the crosslinking accelerator is 0.2~3 parts by weight with respect to 100 parts by weight of the resin syrup. Generally, the crosslinking accelerator is used together with a polymerization promoter.

If the content of the crosslinking accelerator is less than 0.2 part by weight, the molding time becomes longer, and thus the productivity is lowered. And if the content of the crosslinking accelerator is more than 3 parts by weight, cracks may be generated in the artificial marble due to sudden curing.

Further, a radical carrier such as a mercaptan compound containing normal dodecyl mercaptan, t-dodecyl mercaptan, benzyl mercaptan and trimethyl benzyl mercaptan may be used. Preferably, the content of the radical carrier is 0.1~5 parts by weight with respect to 100 parts by weight of the resin syrup.

A color-forming means used in the present invention is not limited particularly. Organic or inorganic pigment or dye which is typically known in the art may be used as an additive for the artificial marble.

The composition for the artificial marble may further contain at least additional agent selected from an antifoaming agent made of silicon or non-silicon; a coupling agent made of a silane containing trimethoxy silane as a main component, acid, or titanate; an ultraviolet absorbing agent made of phenyl salicylate, benzophenone, benzotriazole, nickel derivates, or radical scavengers; a flame retardant made of halogen, phosphor, or inorganic metal; a releasing agent made of stearic acid or silicon; a polymerization inhibitor made of catechol or hydroquinone; and an antioxidant made of phenol, amine, quinone, sulfur or phosphor.

In the step (f), the molding pressure is 5~50 kg/cm$^2$, and the molding temperature is 30~150° C. If the molding pressure is less than 5 kg/cm$^2$, incomplete molding occurs, and if the molding pressure is more than 50 kg/cm$^2$, a burr amount becomes excessive.

In order to provide three or more marble effects, it is necessary to prepare three or more kinds of sheets in the same way, when manufacturing the artificial marble.

MODE FOR THE INVENTION

Hereinafter, the embodiments of the present invention will be described in detail with reference to accompanying drawings. However, the present invention is not limited to embodiments to be described below.

Embodiment

1. Preparing of Single Color Sheet
1) Preparing of Raw Material 0.3 part by weight of pigment is mixed with a raw material slurry containing 100 parts by weight of methyl methacrylate containing a mixture of 30% by weight of polymethyl methacrylate and 70% by weight of methyl methacrylate, 400 parts by weight of aluminium hydroxide, 0.2 part by weight of t-butyl peroxy neodecanoate, 0.3 part by weight of t-amyl peroxy-2-ethylhexanoate, 3 parts by weight of ethylene glycol dimethacrylate, 0.2 part by weight of normal dodecyl mercaptan. 0.2 part by weight of BYK 555(BYK-Chemie company, German) as the antifoaming agent, 0.75 part by weight of BYK 900(BYK-Chemie company, German) and 0.2 part by weight of Hisorp-P (LG Chem, Ltd.) as the ultraviolet absorbing agent, thereby preparing a plastic pigment composition having a single color.

2) Preparing of a Single Colored Sheet

The prepared plastic pigment composition (viscosity of 1,000 cps) having a single color is additionally applied through a supply line into a kneader in which 400 parts by weight of aluminium hydroxide and 200 parts by weight of chips are inserted, and then kneading is performed for about 20 minutes.

The bulk state raw material extracted after the kneading is passed through a slab roller and thus changed into a sheet.

3) Preparing of a Sheet Having a Marble Pattern

After other kind of sheet is further prepared in the same process using a different colored pigment, the two kinds of sheets each of which has a constant shape and weight are inserted into a separate kneader and then mixed for 10 seconds, thereby providing a marble pattern in which two kinds of chip patterns are mixed. A bulk state compound having the marble pattern is extracted and then formed into a sheet having a width of 760, a length of 3680 and a thickness of 14t.

2. Preparing of a Sheet Having a Granite Pattern

The prepared marble sheet is chipped to a particle size of 20 pi.

The chipped chips are spread in a non-directional state and then pressed into a sheet.

3. Manufacturing of Artificial Marble

The sheet state compound having the granite pattern is poured into a mold which is preheated to a temperature of 120° C., molded at a pressure of 15 kg/cm$^2$, separated from the mold and then passed through cooling and sanding processes, thereby manufacturing the artificial marble having a gamete pattern.

While the present invention has been described with respect to the specific embodiments, it will be apparent to those skilled in the art that various changes and modifications may be made without departing from the spirit and scope of the invention as defined in the following claims.

INDUSTRIAL APPLICABILITY

According to the present invention, it is possible to provide a natural marble effect by mixing and molding two or more compounds having different colors and thus to obtain a granite pattern in which patterns of the two or more compounds are smoothly mixed, and also it is possible to obtain a desired pattern remarkably similar to a pattern of natural stone by using a multicolor chip sheet.

The invention claimed is:

1. A method of manufacturing an acrylic artificial marble, comprising:
    (a) kneading a liquid raw material for artificial marble;
    (b) forming two or more kinds of sheets by inputting the kneaded liquid raw material, an inorganic filler and a chip, into a kneader;
    (c) inputting the two or more kinds of sheets formed in step (b) into a separate kneader and mixing them;
    (d) forming a sheet having a marble pattern by using a mixture of (c);
    (e) chipping the sheet having a marble pattern produced in step (d); and
    (f) nondirectionally spreading the chips chipped in step (e) and pressing it to prepare an artificial marble compound having a sheet form, and inputting the artificial marble compound having a sheet form in a mold,
    molding, removing, cooling and polishing a molded product.

2. The method according to claim 1, wherein the artificial marble compound having a sheet form has granite pattern.

3. The method according to claim 1, wherein the liquid raw material for artificial marble of the (a) comprises 50~700 parts by weight of an inorganic filler, 0.2~5 parts by weight of a crosslinking agent and 0.2~3 parts by weight of a crosslinking accelerator with respect to 100 parts by weight of an acrylic resin syrup containing 10~50% by weight of an acrylic resin and 50~90% by weight of an acrylic monomer.

4. The method according to claim 1, wherein the liquid raw material of the (a) has a viscosity of 5,000~100,000 Ps.

5. The method according to claim 3, wherein the acrylic monomer is a methacrylate monomer or a mixture thereof selected from the group consisting of methyl methacrylate, ethyl methacrylate, butyl methacrylate, 2-ethylhexyl methacrylate, benzyl methacrylate and glycidyl methacrylate, and the acrylic resin is at least one polymer of the acrylic monomer.

6. The method according to claim 1, wherein the inorganic filler is at least one selected from the group consisting of aluminium hydroxide, magnesium hydroxide, calcium aluminate, calcium carbonate, silica powder and alumina.

7. The method according to claim 3, wherein the crosslinking agent is at least one selected from the group consisting of ethylene glycol dimethacrylate, diethylene glycol dimethacrylate, triethylene glycol dimethacrylate, tetraethylene glycol dimethacrylate, trimethylolpropane trimethacrylate, 1,6-hexane diol dimethacrylate, polybutylene glycol dimethacrylate and neopentyl glycol dimethacrylate.

8. The method according to claim 3, wherein the crosslinking accelerator is at least one selected from the group consisting of benzoyl peroxide, dicumyl peroxide, butylhydro peroxide, cumylhydro peroxide, t-butyl peroxy maleic acid, t-butylhydro peroxide, t-butyl hydroperoxy butylate, acetyl peroxide, lauroyl peroxide, azobisisobutyronitrile, azobisisodimethylvaleronitrile, t-butyl peroxy neodecanoate and t-amyl peroxy-2-ethylhexanoate.

9. The method according to claim 1, wherein 200~500 parts by weight of the inorganic filler and 50~300 parts by weight of the chip are added with respect to 100 parts by weight of the liquid raw material in the (b).

10. The method according to claim 1, wherein a molding pressure is 5~50 kg/cm$^2$ and a molding temperature is 30~150° C., in the (f).

* * * * *